(12) United States Patent
Thorbjornsson et al.

(10) Patent No.: US 8,882,015 B2
(45) Date of Patent: Nov. 11, 2014

(54) FISHING REEL

(75) Inventors: Ingolfur Thorbjornsson, Gardabaer (IS); Steingrimur Einarsson, Isafjordur (IS)

(73) Assignee: Fossadalur EHF, Isafjordur (IS)

( * ) Notice: Subject to any disclaimer, the term of this patent is extended or adjusted under 35 U.S.C. 154(b) by 215 days.

(21) Appl. No.: 13/264,648

(22) PCT Filed: Apr. 15, 2010

(86) PCT No.: PCT/IS2010/000005
§ 371 (c)(1),
(2), (4) Date: Dec. 28, 2011

(87) PCT Pub. No.: WO2010/119458
PCT Pub. Date: Oct. 21, 2010

(65) Prior Publication Data
US 2012/0097780 A1 Apr. 26, 2012

(30) Foreign Application Priority Data
Apr. 15, 2009 (IS) .............................. 8815

(51) Int. Cl.
*A01K 89/01* (2006.01)
*A01K 89/017* (2006.01)
*A01K 89/016* (2006.01)

(52) U.S. Cl.
CPC .................. *A01K 89/016* (2013.01); *A01K 89/017* (2013.01)
USPC ......................................... 242/322; 242/317

(58) Field of Classification Search
CPC ..................................................... A01K 89/016
USPC .................................................. 242/317, 322
See application file for complete search history.

(56) References Cited

U.S. PATENT DOCUMENTS

| 2,298,481 | A | * | 10/1942 | Hayes | 242/249 |
| 3,053,469 | A | * | 9/1962 | King | 242/229 |
| 3,251,564 | A | | 5/1966 | Neale | |
| 3,298,629 | A | * | 1/1967 | Small | 242/230 |
| 3,572,607 | A | * | 3/1971 | Wilson | 242/265 |
| 3,720,386 | A | * | 3/1973 | Morner | 242/266 |
| 4,262,857 | A | * | 4/1981 | Gilbert | 242/323 |
| 4,746,079 | A | * | 5/1988 | Newell | 242/129.7 |
| 5,372,325 | A | * | 12/1994 | Uehara et al. | 242/322 |
| 5,626,303 | A | * | 5/1997 | Bringsen | 242/265 |
| 5,918,826 | A | * | 7/1999 | Arkowski | 242/295 |
| 5,921,492 | A | * | 7/1999 | Bauer | 242/317 |
| 5,924,639 | A | * | 7/1999 | Atherton | 242/322 |
| 6,209,816 | B1 | * | 4/2001 | Hitomi et al. | 242/322 |
| 7,077,350 | B2 | * | 7/2006 | Koelewyn | 242/295 |

FOREIGN PATENT DOCUMENTS

| FR | 1 183 145 | 7/1959 |
| GB | 490 157 A | 8/1938 |
| WO | WO 2004/073397 A1 | 9/2004 |

* cited by examiner

*Primary Examiner* — Emmanuel M Marcelo
(74) *Attorney, Agent, or Firm* — Muncy, Geissler, Olds & Lowe, P.C.

(57) ABSTRACT

Fly fishing reels, a brake system, and a device for providing decreased tension on the fishing line and the leader are provided. In the system, the axle connecting the fly line spool to the brake system provides a shock absorbing system.

14 Claims, 5 Drawing Sheets

FISHING REEL

FIELD OF THE INVENTION

Figure 1:
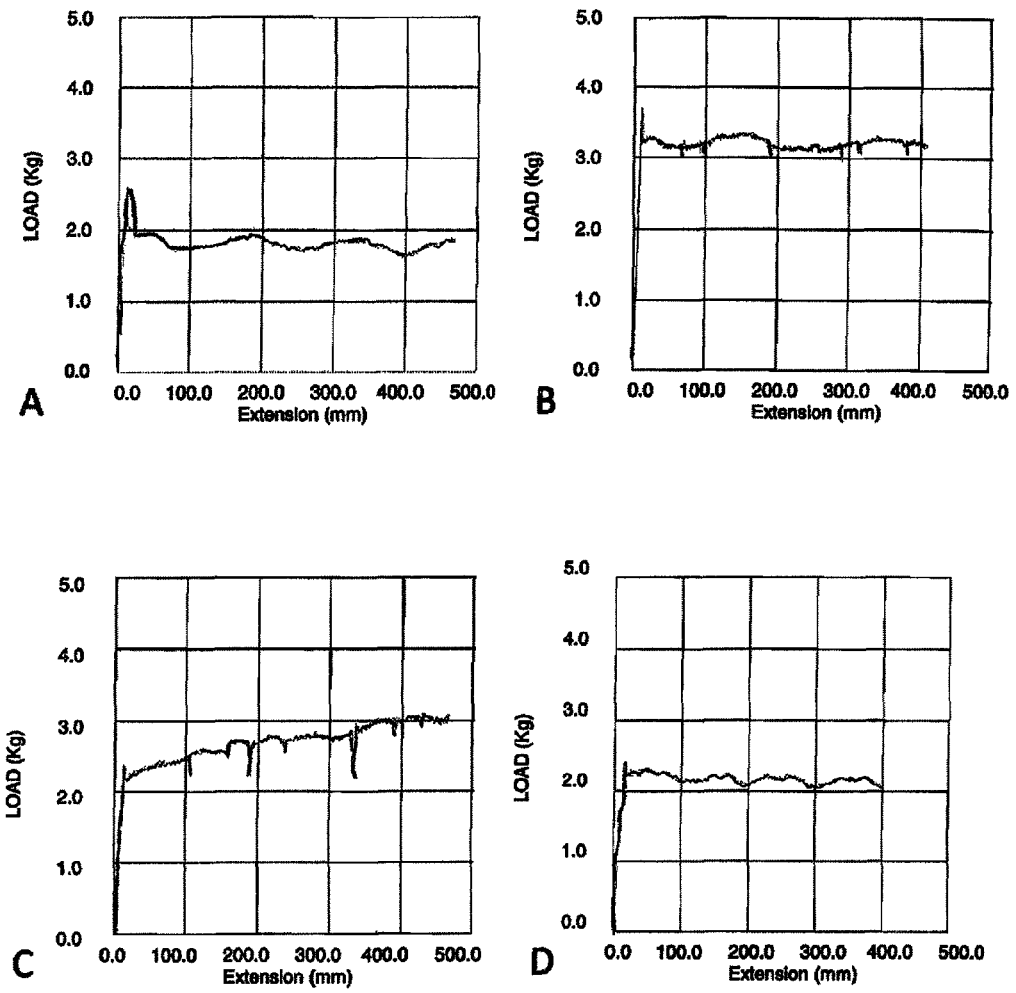

The present invention relates to fishing reels and more specifically the invention relates to a brake system and a device for providing a decreased tension on the fishing line and the leader.

BACKGROUND OF THE INVENTION

Fly-fishing reels are high-tech equipments used for sport fishing of many types of fish, both in salt water and in freshwater. The development of fly-fishing reels has been rapid in recent years, where use of new material for the reels has made them stronger, lighter texture and a beautiful addition to the redesign. The improvements that have been made in brake systems for the reels have transformed their effectiveness in fighting the fish.

Traditional reels such as fly fishing reels have been for years treated as line carrier more than integrated part of the fishing equipment. This has lead to the fact that many fly fishermen use hands on the reel as brake when they fight the fish. Recent reels have been equipped with brake system, earliest with a flat spring system which clicked on a gear when used, later with more integrated brake system with brake plates or cones, where force was used to press the brake plates from one or both sides. All these brake systems; known today, do transform the kinetic energy from the fish pulling out line, into a heat where the energy uptake is due to friction between rotating brake plates and static brake plates. When fish take the fly or take a rush when fighting, the leader together with the line and rod all store energy in bending the rod or stretching the leader and line. When reaching the static friction limit in the brake system, the brake suddenly release line from reel and the dynamic friction coefficient now control the speed of the reel giving out the line. The problem is that the dynamic friction coefficient is in all brake systems lower than the static friction coefficient, and the result is that the rod and line release some of its stored energy, resulting in a lurch quite often braking the leader and the fishermen loose the fish. The brake system for common known fly fishing reels are therefore not taking part in storing the kinetic energy as the fly line, leader and rod, but more acting as a un-integrated part of the fishing equipment.

SUMMARY OF THE INVENTION

The present invention provides a novel shock absorbing system for fishing reels, where the rod or axle connecting the fly line spool to the brake system is made from two or more parts, where one of the rod or axle parts comprises shock absorbing, torsion properties. This means that when a fish takes the fly and swims away, the slack of the line is removed, the line stretches due to its properties and then fly line starts to run from the spool. Because of the torsion properties of the shock absorbing system, the tension of the fishing line is milder than in the traditional reel system, but this is due to the energy uptake through torsion moment in the system of the present invention. If the line force reaches the torsion moment resulting in overcoming the friction coefficient of the connecting brake plates, the brake plate system starts to transform the kinetic energy into heat. Under this process there is always energy stored in the system of the present invention, meaning that there is much lower lurch situation in the system. Furthermore, when the fish stops or turns, the energy stored will act like the fly line, leader and rod by releasing the energy by picking up line on the spool.

In a first aspect of the present invention a fishing reel is provided. The fishing reel comprises a frame and a spool for winding a fishing line on the reel, as well as a central axis structure. The reel further comprises a spool brake unit connected to the axle structure. The invention is characterised in that the central axle structure has at least one portion comprising energy storing means.

In a second aspect of the present invention a brake system for a fishing reel is provided. The brake system comprises a drag unit co-axially connecting a housing frame and a spool of the fishing reel. The drag unit further comprises a spool brake unit and a central axle structure, where the central axle structure has at least one portion comprising energy storing means.

In a specific embodiment of the present invention the fishing reel comprises a housing frame, having a mounting shoe for attaching the reel to the fishing rod. The fishing reel further comprises a spool and a handle for winding a fishing line on the spool, as well as a passage and a central axis of rotation, whereby connection to said housing frame is facilitated. The reel also comprises a drag unit, co-axially connecting said housing frame and said spool, where the drag unit further comprises a one-way bearing unit and a spool brake unit. The invention is characterised in that the drag unit further comprises a central axle structure, connecting the housing frame and said spool. The axle comprises at least one portion having properties, which allow at least partial axial tension of the axle.

In an embodiment of the present invention the axle portion having properties, which allow at least partial axial torsion of the axle, is made of a material selected from a group having elastic properties or torsion properties. In a specific embodiment of the present invention the axle portion is a spring element, such as a helical spring (17). In another embodiment the helical spring is bi-directional.

In the present context the axle portion having properties, which allows at least partial axial torsion of the axle when the fishing line is pulled, can inflict a torsion on this elastic axle portion in both directions, i.e. +/−. In an embodiment of the present invention the axle portion having properties, which allows at least partial axial torsion of the axle has a torsion range from +/−360°, such as +/−180°, +/−90°, +/−60°, +/−45°, +/−25° and +/−15°. Preferably the axle portion having energy storing means or properties allows at partial axial torsion of the axle has a torsion range in both directions of 0 to 45°. In a specific embodiment the axle portion having energy storing means is a helical spring having torsion range in both directions of 25 to 54°.

In an embodiment of the present invention the drag unit is arranged within a sleeve housing comprising the one-way bearing connected to the spool of the fishing reel. The spool brake unit is then connected to the housing and is then interconnected through the axle. In this embodiment the axle is split into two sections each respectively connected to said spool and said housing. The spring element arranged irremovably secured in-between the two axle portions and functions as an active part of the brake system.

In an embodiment of the present invention the respective axle section comprising spring element connecting seat for securing the respective spring element ends to opposite axle ends. The seat and the connecting piece of the spring element are then a perfect match so that the three axle portions will function as a single axle structure.

In an embodiment of the present invention the drag unit comprises a brake adjustment knob connected to the spool brake unit.

In an embodiment of the present invention the fishing reel comprises a frame which is a housing frame, having a mounting means, such as a mounting shoe, for attaching the reel to the fishing rod. The fishing reel further comprises a spool and a handle for winding a fishing line on the spool of the reel, as well as a passage and a central axis of rotations, whereby connection to said housing frame is facilitated. The reel also comprises a drag unit, co-axially connecting said housing frame and said spool, where the drag unit further comprises a one-way bearing unit and a spool brake unit. The central axle structure has at least one portion comprising energy storing means.

The energy storing means is a part of the central axle structure, connecting the housing frame and said spool. The energy storing means has properties, which allow at least partial axial tension of the axle.

In the present context the term "energy storing means" relates to means which allows at least partial axial tension of the axle of the reel, such as an elastic member or a spring element.

In the present context, the brake system can be part of any fishing reel, such as, but not limited to: traditional fly-fishing reels, casting reels and spinning reels.

DETAILED DESCRIPTION OF THE PRESENT INVENTION

The present invention will now be disclosed in relation to the following drawings.

FIGS. 1A-D show diagrams of strain vs. turning of a spool on fishing reels for traditional (prior art) reels.

Figure 2:
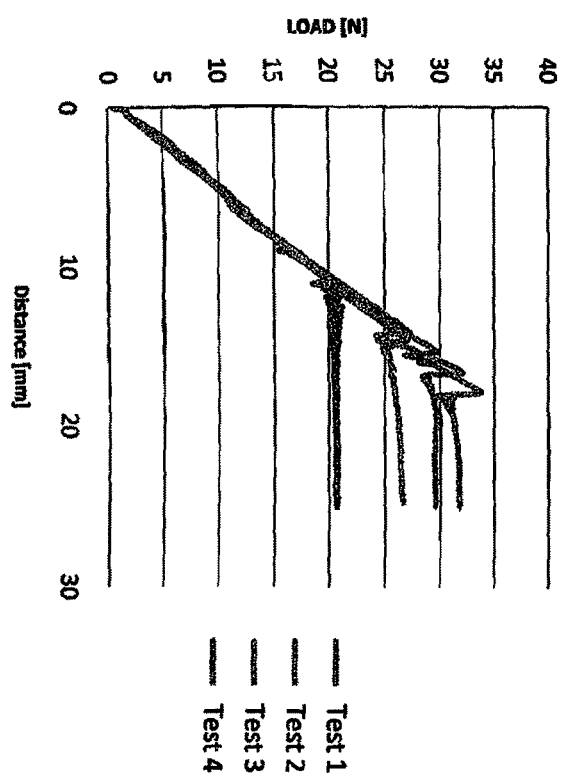

FIG. 2. shows a diagram of strain vs. turning of a spool on fishing reels for the fishing reel of the present invention.

Figure 3:
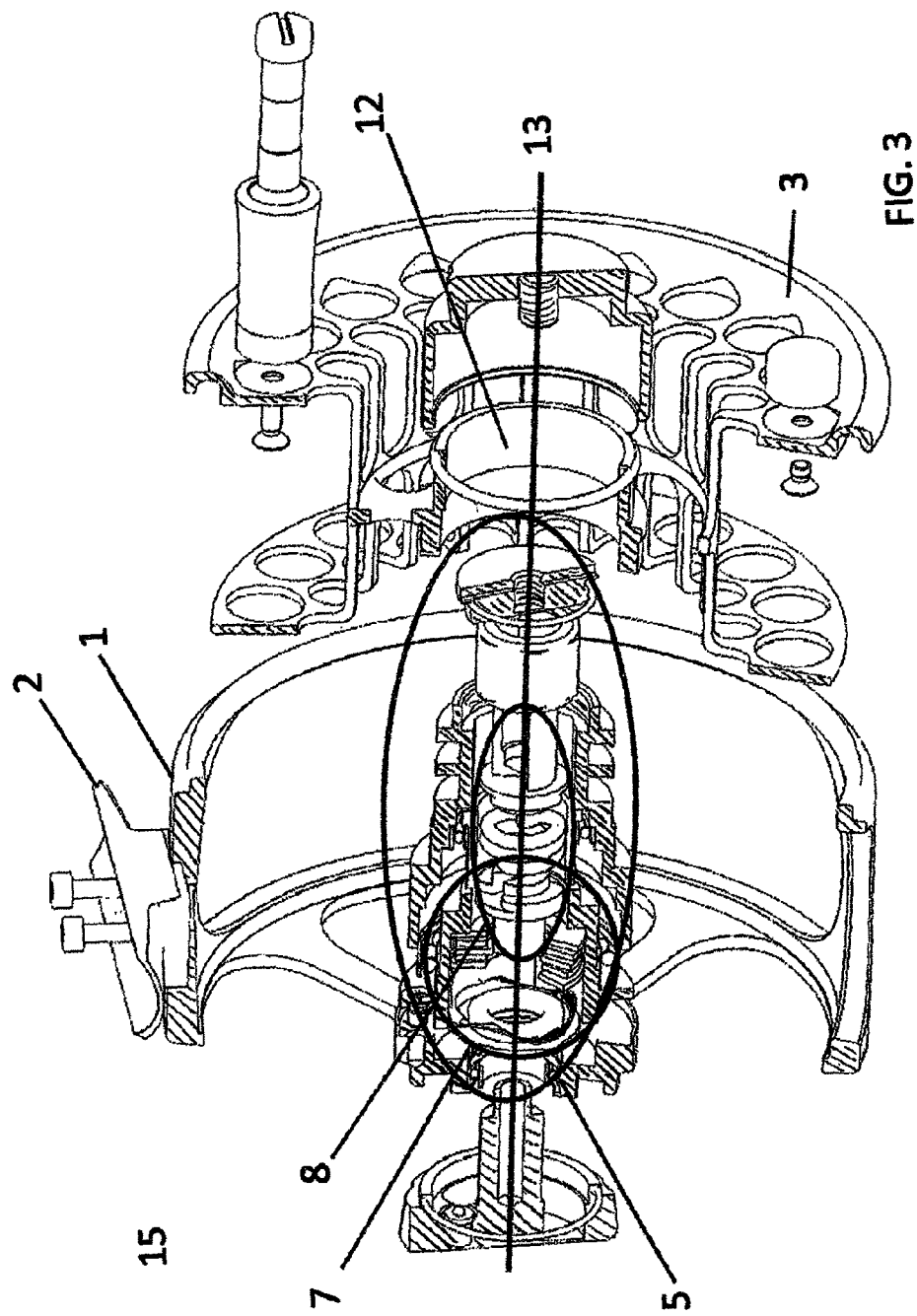

FIG. 3. shows an exploded view of the fishing reel of the present invention indicating major units and systems of the reel.

Figure 4:
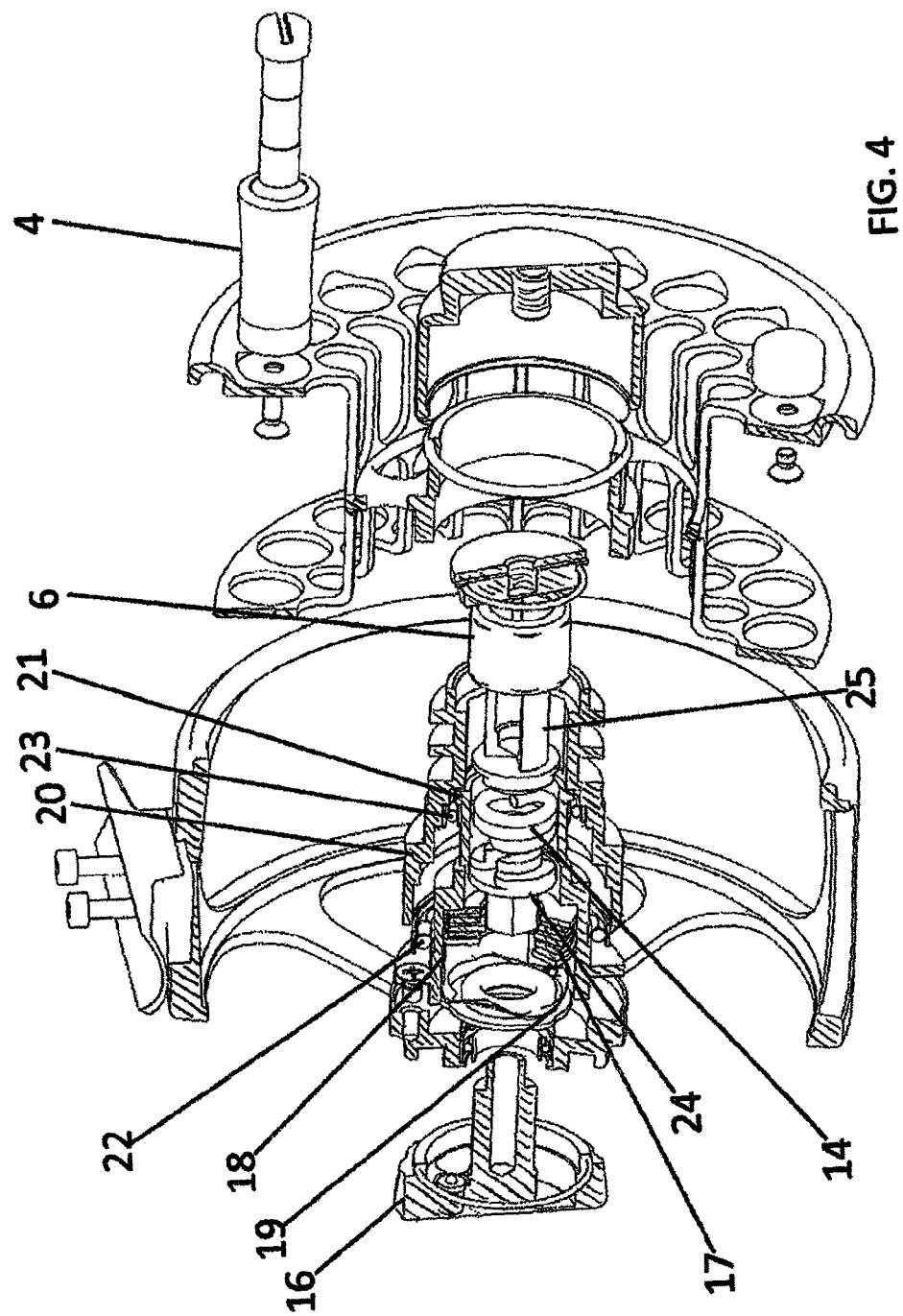

FIG. 4. shows an exploded view of the fishing reel of the present invention indicating the different components of the reel in further detail.

Figure 5:
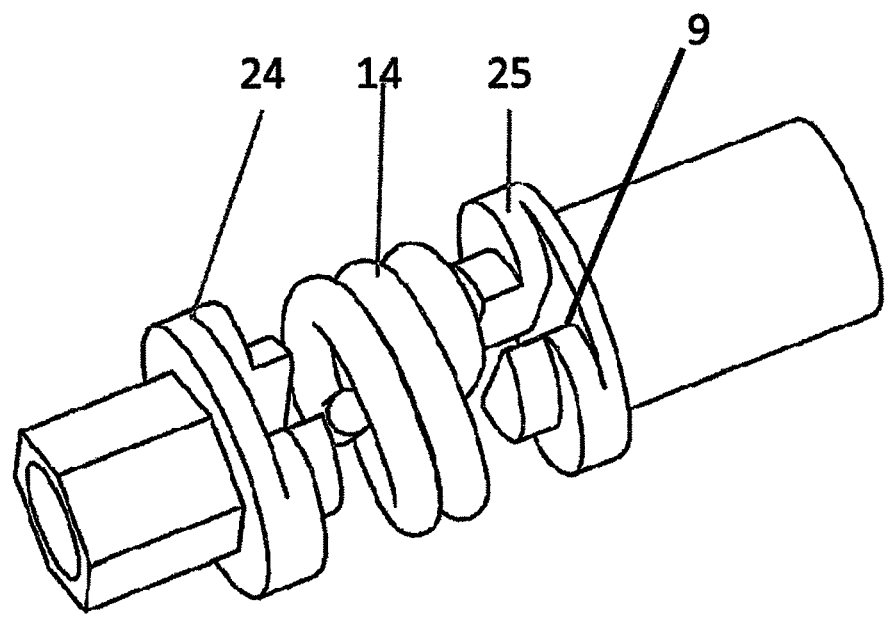

FIG. 5. shows the axle of the present invention.

FIG. 1 shows the difference between a fly fishing reel having a conventional brake system and a fly fishing reel of the present invention. Several prior art fly-fishing reels from some of the major produces were compared to the fishing reel of the present invention. The reels were tested in a tensile strength measuring device to show the correlation between load and the length of line pulled form a spool of a fishing reel. The reels were tested in the following manner. The fly-fishing line was pulled off the spool and the underline was tied/attached to the tensile strength measuring device. The brake of the reel was set at highest setting and then the 300 mm of line were pulled of the reel.

The load report in FIG. 1A-D shows a high and sharp rise in the curve when the brake activity goes from standstill position to rotation of the axle. Furthermore, when the line is being pulled off the spool (after the first high and sharp peak in the load report) the load report shows an uneven (sinus shaped) line.

FIG. 2 shows testing of the fly-fishing reel of the present invention in the same manner as the reels shown in FIG. 1. The figure shows four individual tests. The slope of the curve is much lower/smoother and the line is when the line is being pulled off the spool is almost straight after the rise of the curve.

The fly fishing reel (15) shown in FIG. 3 comprises housing frame (1) having a mounting shoe (2) and a spool (3) for winding a fishing line thereon. The spool (3) has an axis of rotation (13). The spool further comprises a passage (12) whereby said spool is connected to said housing frame (1). The fly fishing reel further comprises a drag unit (5) co-axially connecting the housing frame (1) and the spool (3) and an axle structure (8) connecting said housing frame and said spool.

In FIG. 4 the individual components of the reel are shown in more detail. The drag unit further comprises a one-way bearing unit (6), a spool brake unit (7) and the drag knob (16). The spool brake unit (7) is a multi disc brake unit having ceramic and carbon fibre discs (17) surrounded by a disc brake housing (18). The drag knob (16) is arranged as shown in the figure on the brake disk portion (18) of the axle structure (8). When the drag/brake knob (16) is turned it will press on/take pressure off the flat spring (19) resulting in an increased or released press on the brake disc plates (17) resulting in higher or lower friction coefficient for the brake system. The components of the drag unit (5), apart from the drag knob (16), including the disc brake unit and the one way bearing unit, are contained within a sleeve housing (20) connecting to the disc brake housing (18) and the axle housing (21) through bearings (22,23). This arrangement will allow the spool to rotate freely in one direction due to bearings (22,23) and the position of the one way bearing unit (6) which determinates in which direction the spool will rotate freely. The one way bearing unit (6) will turn the axle portion connected to the one way bearing unit (6) in the other direction by force of the user and thereby give torsion moment on the spring axle (8) which will transfer the turning moment over to the axle portion (24) connected to the brake plates (17). The spool (3) further comprises a handle (4) for winding a fishing line on the spool, a passage (12) along the central axis of rotation (13) through which the connection to said housing frame (1) is facilitated.

FIG. 5 shows the axle structure (8) of the fly fishing reel (15) according to one embodiment of the present invention. The axle (8) is divided into three portions, a brake portion (24) extending into the brake disc assembly and a drive portion (25), which is connected to the one-way bearing unit (6). The third portion is a portion (14) comprising properties allowing at least partial axial torsion of said axle (8) and connecting the brake portion (24) and the drive portion (25). In this embodiment this portion is a helical spring. A seat portion (9) in both the brake portion (24) and the drive portion (25) of the axle structure connects these two axle portions to the helical spring.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single reel or brake system may fulfil the functions of several items recited in the claims. The mere fact that certain measures are recited in mutually different dependent claims does not indicate that a combination of these measures cannot be used to advantage. Any reference signs in the claims should not be considered as limiting the scope.

The invention claimed is:

1. A fishing reel comprising:
   a frame,
   a spool for winding a fishing line on the reel,
   a central axle structure, connecting said frame and said spool, and
   a spool brake unit, connected to said axle structure,
wherein said central axle structure is made from a plurality of parts including a rod part and an axle part, and wherein one of the rod or axle parts comprises shock absorbing, torsion properties,
wherein said axle portion is a spring element, and
wherein said drag unit is arranged within a sleeve housing and comprises a one-way bearing connected to said spool, said spool brake unit connected to said frame and being interconnected through said axle wherein said axle is split into two sections each respectively connected to said spool and said housing, having said spring element irremovably secured there in-between.

2. The fishing reel according to claim 1, wherein the fishing reel further comprises:
   a passage and a central axis of rotation whereby connection to said frame is facilitated,
   a drag unit co-axially connecting said frame and said spool, said drag unit further comprising:
      a one-way bearing unit, and
      the central axle structure.

3. The fishing reel according claim 2, wherein said drag unit comprises a brake adjustment knob connected to said spool brake unit.

4. The fishing reel according to claim 1, wherein said axle structure has a portion made from material selected from a group of materials having elastic properties or the torsion properties.

5. The fishing reel according to claim 1, wherein said spring element is a helical spring.

6. The fishing reel according to claim 5, wherein said helical spring is bi-directional.

7. The fishing reel according to claim 5, wherein said helical spring has a torsion range from +/−360°.

8. The fishing reel according to claim 1, wherein said respective axle section comprises a spring element connecting seat for securing respective spring element ends to opposite axle section ends.

9. The fishing reel according to claim 1, wherein said frame is a housing frame, having a mounting shoe.

10. The fishing reel according to claim 1, wherein said spool has a handle for winding the fishing line on the spool.

11. A brake system for a fishing reel comprising;
    a drag unit co-axially connecting a housing frame and a spool of said fishing reel, said drag unit further comprising:
       a spool brake unit, and
       a central axle structure,
wherein said central axle structure has at least one portion for shock absorbing and torsion, and
wherein the at least one portion comprises a spring element in the central axle structure and
wherein the drag unit is arranged within a sleeve housing and comprises a one-way bearing connected to the spool, the spool brake unit being connected to the frame and being interconnected through the axle wherein the axle is split into two sections each respectively connected to said spool and said housing, having the spring element irremovably secured there in-between.

12. The brake system for a fishing reel according to claim 11, wherein the brake system is part of one of a fly-fishing reel, casting reel and spinning reel.

13. A fishing reel comprising:
    a frame,
    a spool for winding a fishing line on the reel,
    a central axle structure, connecting said frame and said spool, and
    a spool brake unit, connected to said axle structure,
wherein said central axle structure has a spring element and wherein said drag unit is arranged within a sleeve housing and comprises a one-way bearing connected to said spool, said spool brake unit connected to said frame and being interconnected through said axle wherein said axle is split into two sections each respectively connected to said spool and said housing, having said spring element irremovably secured there in-between.

14. The fishing reel according to claim 13, wherein said respective axle section comprises a spring element connecting seat for securing respective spring element ends to opposite axle section ends.

* * * * *